United States Patent [19]
Yamazaki

[11] 3,954,653
[45] May 4, 1976

[54] LIQUID CRYSTAL COMPOSITION HAVING HIGH DIELECTRIC ANISOTROPY AND DISPLAY DEVICE INCORPORATING SAME

[75] Inventor: Yoshio Yamazaki, Shimosuwa, Japan

[73] Assignee: Kabushiki Kaisha Suwa Seikosha, Tokyo, Japan

[22] Filed: July 3, 1974

[21] Appl. No.: 485,674

[30] Foreign Application Priority Data
July 6, 1973  Japan.................................. 48-75764

[52] U.S. Cl............................ 252/299; 252/408;
350/150; 350/160 LC
[51] Int. Cl.² ........................ C09K 3/34; G02F 1/13
[58] Field of Search........................... 252/408, 299;
350/160 LC, 150

[56] References Cited
UNITED STATES PATENTS

| | | | |
|---|---|---|---|
| 3,499,702 | 3/1970 | Goldmacher et al. | 252/408 LC |
| 3,625,591 | 12/1971 | Freiser et al. | 252/408 LC |
| 3,650,603 | 3/1972 | Heilmeirer et al. | 252/408 LC |
| 3,712,047 | 1/1973 | Girard | 252/408 |
| 3,773,747 | 11/1973 | Steinsträsser | 252/408 LC |
| 3,784,280 | 1/1974 | Bigelow | 350/160 LC |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/408 LC |
| 3,816,336 | 6/1974 | McCaffrey et al. | 252/408 LC |
| 3,891,307 | 6/1975 | Tsukamoto et al. | 252/299 |

FOREIGN PATENTS OR APPLICATIONS

| | | | |
|---|---|---|---|
| 2,024,269 | 12/1971 | Germany | 252/299 |
| 807,165 | 3/1974 | Belgium | 252/299 |
| 2,321,632 | 11/1974 | Germany | 252/299 |
| 4,731,886 | 11/1972 | Japan | 252/299 |
| 4,731,883 | 11/1972 | Japan | 252/299 |

OTHER PUBLICATIONS
Gray, G. W., et al., Electronics Letters, Vol. 9, No. 5, pp. 130–131 (Mar. 22, 1973).

*Primary Examiner*—Benjamin R. Padgett
*Assistant Examiner*—T. S. Gron
*Attorney, Agent, or Firm*—Blum Moscovitz Friedman & Kaplan

[57] ABSTRACT

A liquid crystal composition having high dielectric anisotropy has a wide mesomorphic temperature range as well as high dielectric anisotropy. The material is suitable for use in a display device in which the liquid crystal material is used for rotating the plane of polarized light, the display device further incorporating crossed polarizer and analyzer filters, so that activating transparent electrodes on the inner surface of the plates can be used as a means of selectively permitting or blocking transmission of light through the device. The utility of the device is increased by using a filter for blocking those frequencies in the spectrum which are absorbed by the liquid crystal composition and by using a reflector in combination therewith.

10 Claims, 2 Drawing Figures

LIQUID CRYSTAL COMPOSITION HAVING HIGH DIELECTRIC ANISOTROPY AND DISPLAY DEVICE INCORPORATING SAME

BACKGROUND OF THE INVENTION

Display devices are known in which a liquid crystal material is placed between two transparent plates having on the inner surfaces thereof mosaic patterns or numerical segments which are transparent and conductive and which can be connected to an external source of voltage. The inner surfaces of the electrodes are rubbed with gauze, cotton, absorbent cotton, etc., each of the electrode inner surfaces being rubbed in a single direction. In joining the two transparent plates to form a liquid crystal display cell, the plates are oriented so that the rubbing directions on the opposed plates are at right angles to each other.

When suitable liquid crystal material is placed between such plates, the liquid crystal molecules adjacent each of the plates align themselves with the rubbing directions of the adjacent plate. The molecules lying between the plates then orient themselves so as to form a quarter-turn helix between the plates. In the absence of an electric field, such a liquid crystal material will rotate the plane of polarized light through an angle of 90°.

When a liquid crystal cell constructed as described is placed between two polarizing filters, the axes of which are at right angles to each other, then incident light will be transmitted through the cell. However, if an electric field of sufficient strength is imposed across the cell through use of an external source of voltage in combination with the transparent electrodes on the inner surfaces of the plates, then the optical activity of the liquid crystal material can be decreased to zero, due to the fact that the molecules will tend to align themselves with the electric field. As a result, incident light will be blocked from passage through the cell.

In order for liquid crystal material to function as described, the composition must have a high positive dielectric anisotropy. When an electric field is imposed upon such a material, the material is transformed from one having double refraction to an isotropic liquid. This property is valuable since a cell containing such a liquid can be used as an optical shutter and, moreover, the shutter functions only in those regions of the cell across which the electric field is applied.

Nematic liquid crystals having positive dielectric anisotropy have a structure such that the dipole moment of the liquid crystal molecule lies along the direction of the major axis thereof. It is for this reason that the molecule, in the presence of a sufficiently strong electric field, orients itself so that the major axis of the molecule is aligned with the electric field.

Most of the nematic liquid crystals of high dielectric anisotropy known up to the present time have been of the Schiff-type or of the ester type as shown by the following structural formulae:

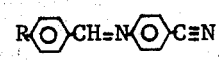

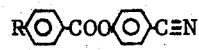

These materials have relatively poor chemical stability and are degraded easily by light and by moisture. The effect of moisture is particularly severe since when an electric field is applied, conduction results with consequent oxidation and reduction as well as hydrolysis of the material.

In attempting to find liquid crystal materials suitable for display devices of the type under consideration, the following relationship between the dielectric anisotropy $\Delta\epsilon$ and the operative threshold voltage is pertinent:

$$V_{th} \alpha \sqrt{\frac{k}{\Delta\epsilon}}.$$

where
$\Delta\epsilon = \epsilon_\parallel - \epsilon_\perp$,
$\epsilon_\perp$ and $\epsilon_\parallel$ being the dielectric constants of the molecule in the directions perpendicular and parallel to the molecular axes respectively. The value of $k$ is such that if a nematic composition has a $\Delta\epsilon$ as large as 10 – 12, then a display device can be driven by a voltage as low as 1.5.

SUMMARY OF THE INVENTION

Liquid crystal compositions having a dielectric anisotropy making them suitable for rotating plane-polarized light includes at least one compound of type A and at least one compound of type B, the compounds of type A having the following structures:

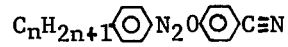

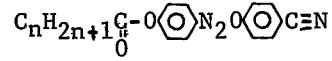

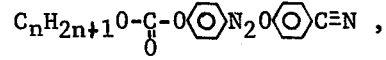

the compounds of type B having the following structures:

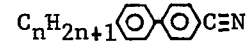

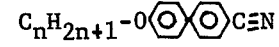

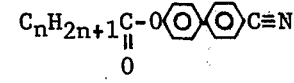

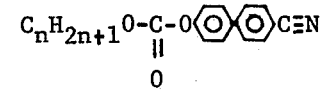

$n$ ranging from 1 to 10.

Such compositions have high dielectric anisotropy and suitably chosen mixtures have wide mesomorphic temperature ranges including room temperature.

To use these compositions in a liquid crystal display device, the display device should be constructed as described in the Background of the Invention. Preferably, a reflector is placed exterior to the polarizing filter furthest from the region from which the device is to be viewed. Also, where the device is to be subject to direct rays of the sun or to light from another source containing frequencies which are absorbed by the liquid crystal composition, then a filter should be placed in a position to protect the liquid crystal material from such frequencies.

Accordingly, an object of the present invention is an improved liquid crystal display device utilizing liquid crystal material having a high dielectric anisotropy.

Another object of the present invention is a liquid crystal material display device using a liquid crystal material having high dielectric anisotropy and a wide mesomorphic phase temperature range including room temperature.

Another object of the present invention is an improved liquid crystal display device using a liquid crystal composition having enhanced stability and high dielectric anisotropy.

An important object of the present invention is a liquid crystal composition having a wide mesomorphic temperature range and high stability.

A significant object of the present invention is a liquid crystal composition suitable for use in liquid crystal display devices wherein said liquid crystal compositions have high dielectric anisotropy and a wide mesomorphic temperature range, preferably including room temperature.

Still other objects and advantages of the invention will in part be obvious and will in part be apparent from the specification.

The invention accordingly comprises a composition of matter possessing the characteristics, properties, and the relation of components which will be exemplified in the composition hereinafter described and an article including said composition of matter, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
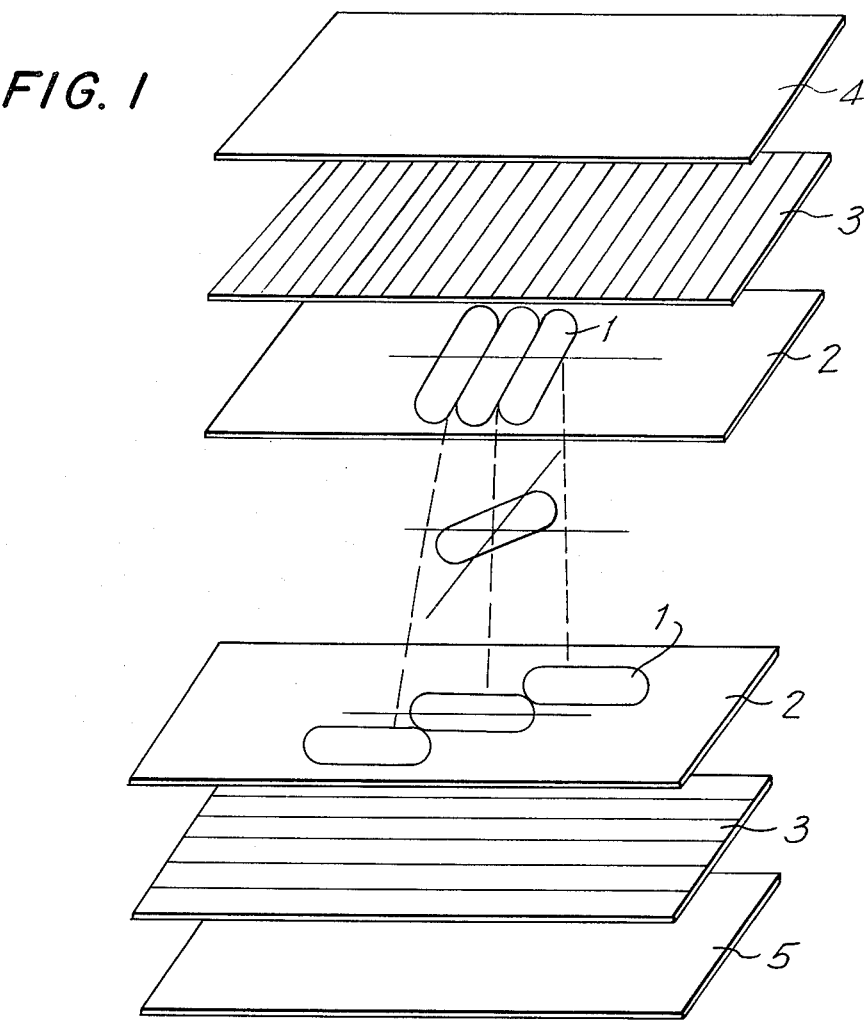
FIG. 1 is an exploded schematic view of a device in accordance with the present invention.
Figure 2:
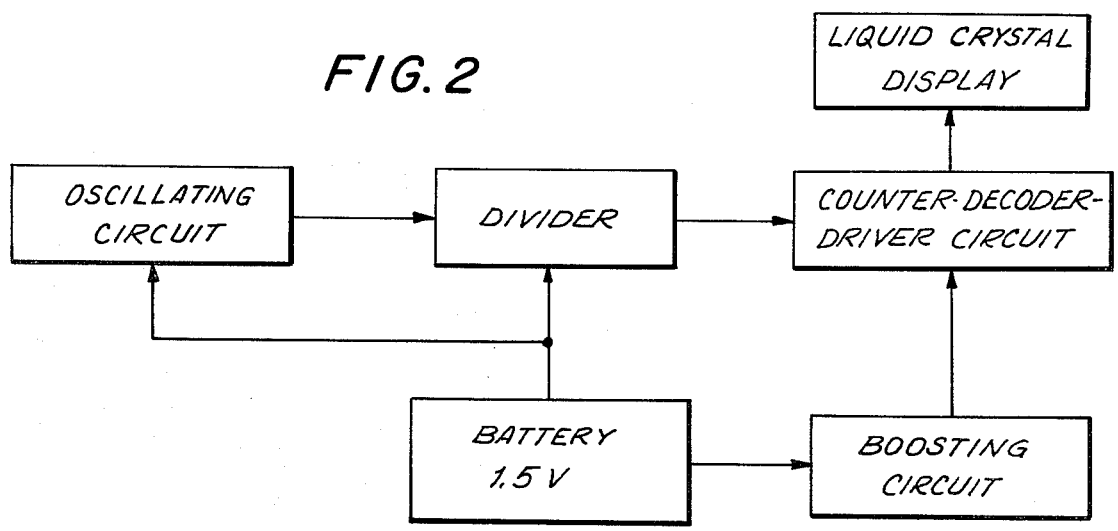
FIG. 2 is a block diagram of electrical circuitry suitable for driving a device in accordance with the present invention when said device is part of a timepiece.

A display device in accordance with the present invention is shown schematically in FIG. 1 where liquid crystal molecules 1 are disposed between transparent plates 2 at the outer surfaces of which are polarizing filters 3, said polarizing filters being positioned with their polarization axes at right angles to each other as indicated by the parallel lines in each of said filters. Molecules of liquid crystal at opposite faces of the cell are shown to be oriented at right angles to each other with a molecule in an intermediate position in the cell being at an intermediate angle. Transparent plates 2 have transparent conductive portions or segments or mosaic (not shown) on the inner faces thereof. Liquid crystal display cells having transparent conductive portions or segments on the inner faces of the opposing plates are widely known in the art and are shown in Bergey U.S. Pat. No. 3,722,206. Details are shown in FIGS. 2, 3 and 5.

The inner surfaces of each of each of the transparent plates 2 have been unidirectionally rubbed with gauze, cotton, absorbent cotton, etc., prior to assembly. Alternatively, the inner surfaces have had Teflon deposited thereon after which they were rubbed or scratched unidirectionally. In the assembly of the cell, the plates are positioned so that the directions of rubbing on each of the plates are perpendicular to each other. The molecules of liquid crystal, where such molecules have dipoles which coincide with the axes of the molecules, tend to align themselves with the scratches or, at least, with the rubbing direction on each of the plates 2. As a result, the molecules at opposite interior faces of the cells are aligned in directions which are perpendicular to each other. As aforenoted, the molecules at intermediate positions between the walls of the cell take up intermediate orientations, so that a helix is formed between the two plates. The helix is believed to consist of a quarter-turn, as a result of which polarized light passing through the cell is rotated by 90°.

In order to obtain the desired rotation, the dielectric anisotropy $\Delta\epsilon$ of the liquid crystal material must be high, generally at least 10. In addition, for the display device to be at maximum usefulness, it is necessary that the liquid crystal material be in the mesomorphic phase at room temperature and, preferably, for as wide a range of temperatures as possible. Thus far, it has not been possible to achieve these characteristics using a single compound.

Novel liquid crystal compositions in accordance with the present invention consist of two types of compounds termed A and B for convenience. Compounds of type A have the following structure:

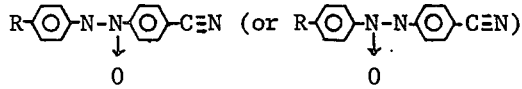

Compounds of type B have the following structure:

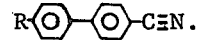

The radical R may be selected from the group consisting of $n\text{-}C_nH_{2n+1}$, $n\text{-}C_nH_{2n+1}O$, $n\text{-}C_nH_{2n+1}COO$ and $n\text{-}C_nH_{2n+1}OCOO$, and $n$ ranges from 1 to 10.

The dielectric anisotropy $\Delta\epsilon$ of compounds of type A is 14–15 which is the largest value for any known liquid crystals. However, type A compounds cannot be used alone due to the fact that the mesomorphic phase temperature is high. The $\Delta\epsilon$ of compounds of type B is 10 – 11 which is somewhat smaller, but compounds of type B are generally in the mesomorphic phase at room temperature. The mixture of the two compounds to constitute the composition of the present invention has a high positive dielectric anisotropy and a wide range of liquid crystal phase temperature, which, in general, includes room temperature.

As aforenoted, when compositions in accordance with the present invention are placed between unidirectionally rubbed plates positioned with rubbing angles at 90° to each other, then, if a polarizer and an analyzer are placed at opposite faces of the cell, incident light will pass through the cell in the absence of an electric field. However, if an electric field of sufficient strength is imposed upon selected portions of the liquid crystal material by means of transparent electrodes on the inner faces of the plates forming the walls of the cell, then the helical alignment of the molecules between the plates will be eliminated, since the molecules will tend to align themselves with the electric field. As a result, the optical rotatory power of the portions of the liquid crystal material in the electric field will be destroyed and light will not be transmitted through these portions. As is evident, the two polarizing filters could be aligned with each other, in which case light would be transmitted only when an electric field is imposed.

The type A and type B compounds have been given in the form of general formulae in the Summary of the Invention.

Table I gives the melting points (a) and the clearing points (b) for a variety of compounds of both types:

TABLE I

| Compound A | a(°C) | b(°C) |
|---|---|---|
| p-ethyl-p'-cyanoazoxybenzene $(C_2H_5-\bigcirc-N_2O-\bigcirc-C\equiv N)$ | 90 | 106 |
| p-n-butyl-p'-cyanoazoxybenzene $(C_4H_9-\bigcirc-N_2O-\bigcirc-C\equiv N)$ | 61 | 103 |
| p-n-hexyloxy-p'-cyanoazoxybenzene $(C_6H_{13}O-\bigcirc-N_2O-\bigcirc-C\equiv N)$ | 86 | 134 |
| p-n-hexanoyloxy-p'-cyanoazoxybenzene $(C_5H_{11}COO-\bigcirc-N_2O-\bigcirc-C\equiv N)$ | 77 | 142 |
| p-n-heptanoyloxy-p'-cyanoazoxybenzene $(C_6H_{13}COO-\bigcirc-N_2O-\bigcirc-C\equiv N)$ | 52 | 133 |
| p-n-octanoyloxy-p'-cyanoazoxybenzene $(C_7H_{15}COO-\bigcirc-N_2O-\bigcirc-C\equiv N)$ | 58.5 | 133 |
| $C_6H_{13}OCOO-\bigcirc-N_2O-\bigcirc-C\equiv N$ | 65 | 131 |
| $C_5H_{11}OCOO-\bigcirc-N_2O-\bigcirc-C\equiv N$ | 63 | 131 |

| Compound B | a(°C) | b(°C) |
|---|---|---|
| 4-n-amyl-4'-cyanobiphenyl $(C_5H_{11}-\bigcirc-\bigcirc-C\equiv N)$ | 22 | 34 |
| 4-n-hexyl-4'-cyanobiphenyl $(C_6H_{13}-\bigcirc-\bigcirc-C\equiv N)$ | 14 | 27 |
| 4-n-heptyl-4'-cyanobiphenyl $(C_7H_{15}-\bigcirc-\bigcirc-C\equiv N)$ | 28 | 42 |
| 4-n-hexyloxy-4'-cyanobiphenyl $(C_6H_{13}-O-\bigcirc-\bigcirc-C\equiv N)$ | 58 | 76 |

As can be seen from the above Table, only two of the compounds have mesomorphic phases which include room temperature. However, binary and ternary compositions, as shown in Table II, have mesomorphic phases which include room temperature and the mesomorphic temperature range is wide.

TABLE II

| Mixed composition | wt. % | a(°C) | b(°C) |
|---|---|---|---|
| 4-n-heptyl-4'-cyanobiphenyl | 30 | 10 | 90 |
| p-n-heptanoyloxy-p'-cyanoazoxybenzene | 70 | | |
| 4-n-amyl-4'-cyanobiphenyl | 30 | −10 | 80 |
| 4-n-hexyloxy-4'-cyanobiphenyl | 30 | | |
| p-n-butyl-p'-cyanoazoxybenzene | 40 | | |
| 4-n-hexyl-4'-cyanobiphenyl | 20 | | |
| p-methoxy-p'-n-butylazoxybenzene | 50 | −20 | 80 |
| p-ethyl-p'-cyanoazoxybenzene | 30 | | |

Many other examples could be adduced but the above examples are sufficient to show that it is readily possible to provide liquid crystal compositions having the requisite high positive dielectric anisotropy. It is the high compatibility of the azoxy-type A compounds and the biphenyl-type B compounds which make the wide variety of compositions possible. Moreover, the range of operable temperatures can be further extended by adding azoxy-type liquid crystal materials other than those subsumed under the structural formula A. Examples, for instance, are:

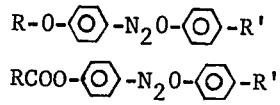

In these compounds R and R' have the same meaning as given for R in the type A and B compounds.

The circuitry necessary for utilizing a liquid crystal display device as described above, in a timepiece, is shown in FIG. 2. An oscillator which is a time standard supplies a high frequency signal to a divider which in turn supplies signals to a counter-decoder-driver circuit. The counter-decoder-driver circuit then activates selected segments of characters in the form of transparent conductive electrodes on the inner surfaces of the cell walls to form numerals showing the time. The oscillator and the divider are operated by a 1.5 volt battery which may consist of a single cell. Where the counter-decoder-driver circuit requires a higher voltage for operation, a boosting circuit is interposed between the battery and the counter-decoder-driver circuit. In general, the liquid crystal display device as utilized in the compositions of the present invention do not require the boosting circuit. As a result, a timepiece incorporating the liquid crystal display device and the compositions of the present invention can be designed to be simpler and to be manufactured at lower costs than those of the prior art.

The visibility of the characters in a display device in accordance with the present invention can be improved by positioning a reflector 5 exterior to the polarizing filter furthest from the region from which the display device is to be viewed. Also, where the liquid crystal composition absorbs specific frequencies, it is desirable to interpose a filter 4 to protect the liquid crystal composition from temperature rise as well as from possible degradation. This is particularly important in the case of a wristwatch which may be exposed to the direct rays of the sun when used outdoors.

It should be noted that the reflector 5 need not be a separate element in the system but can be formed on the outer face of the polarizing filter furthest from the region from which the instrument is to be viewed. Moreover, the reflector is preferably in the form of a frosted mirror so as to provide a diffuse reflection.

Display devices in accordance with the present invention can be used in portable electronic table calculators, pH meters, multi-meters, stop-watches, clocks etc.

It will thus be seen that the objects set forth above, among those made apparent from the preceding description, are efficiently attained, and, since certain changes may be made in the above composition of matter and in the article including said composition of matter without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An improvement in a liquid crystal display device wherein a liquid crystal cell includes opposed plates having unidirectionally rubbed inner surfaces, at least one transparent electrode on each of said inner surfaces, said electrodes being connectable to an external voltage source, the rubbing directions on said inner surfaces being at right angles to each other, and polarizing filters at the outer surfaces of said plates, the axes of said plates being at right angles to each other, wherein said improvement comprises a liquid crystal composition containing nitriles, wherein said nitriles consist, except for minor quantities of impurities, of at least one compound of the formula A A: 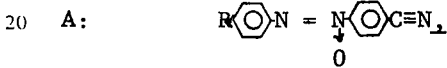

taken to be equivalent to

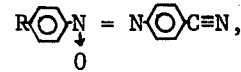

and at least one compound of the formula B,

B: 

where R is selected from the group consisting of n-$C_nH_{2n+1}$, n-$C_nH_{2n+1}O$, n-$C_nH_{2n+1}COO$ and n-$C_nH_{2n+1}OCOO$, and n ranges from 1 to 10.

2. The improvement as defined in claim 1 wherein said device further comprises a reflector exterior to that polarizing filter furthest from the region from which said liquid crystal display device is to be viewed.

3. The improvement as defined in claim 1, further comprising a light filter positioned for protecting the liquid crystal material in said device from those frequencies of the spectrum which are absorbed by said liquid crystal material.

4. The improvement as defined in claim 1 wherein said composition consists of 30% of 4-n-heptyl-4'-cyanobiphenyl and 70% of p-n-heptanoyloxy-p'-cyanoazoxybenzene.

5. The improvement as defined in claim 1 wherein said composition consists of 30% of 4-n-amyl-4'-cyanobiphenyl, 30% of 4-n-hexyloxy-4'-cyanobiphenyl and 40% of p-n-butyl-p'-cyanoazoxybenzene.

6. The improvement as defined in claim 1 wherein said composition consists of 20% of 4-n-hexyl-4'-cyanobiphenyl, 50% of p-methoxy-p'-n-butylazoxybenzene and 30% of p-ethyl-p'-cyanoazoxybenzene.

7. A liquid crystal composition, having high dielectric anisotropy and a wide mesomorphic range encompassing room temperature, containing nitriles, wherein said nitriles consist, except for minor quantities of impurities, of at least one compound of the formula A

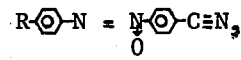

taken to be equivalent to

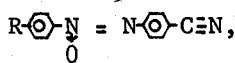

and at least one compound of the formula B

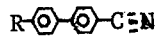

8. The liquid crystal composition as claimed in claim 7, wherein said composition consists of 30% of 4-n-heptyl-4'-cyanobiphenyl and 70% of p-n-heptanoyloxy-p'-cyanoazoxybenzene.

9. The liquid crystal composition as claimed in claim 7, wherein said composition consists of 30% of 4-n-amyl-4'-cyanobiphenyl, 30% of 4-n-hexyloxy-4'-cyanobiphenyl and 40% of p-n-butyl-p'-cyanoazoxybenzene.

10. The liquid crystal composition as claimed in claim 7, wherein said composition consists of 20% of 4-n-hexyl-4'-cyanobiphenyl, 50% of p-methoxy-p'-n-butylazoxybenzene and 30% of p-ethyl-p'-cyanoazoxybenzene.

* * * * *